(12) United States Patent
Zhang et al.

(10) Patent No.: US 10,365,399 B2
(45) Date of Patent: *Jul. 30, 2019

(54) METHOD FOR INFRARED IMAGING DETECTION AND POSITIONING OF UNDERGROUND TUBULAR FACILITY IN PLANE TERRAIN

(71) Applicant: HUAZHONG UNIVERSITY OF SCIENCE AND TECHNOLOGY, Wuhan, Hubei (CN)

(72) Inventors: Tianxu Zhang, Hubei (CN); Wenxuan Ma, Hubei (CN); Cen Lu, Hubei (CN); Longwei Hao, Hubei (CN); Yuehuan Wang, Hubei (CN); Nong Sang, Hubei (CN); Weidong Yang, Hubei (CN); Hu Zhu, Hubei (CN)

(73) Assignee: HUAZHONG UNIVERSITY OF SCIENCE AND TECHNOLOGY, Wuhan, Hubei (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/106,703

(22) PCT Filed: Sep. 2, 2014

(86) PCT No.: PCT/CN2014/085758
§ 371 (c)(1),
(2) Date: Jun. 20, 2016

(87) PCT Pub. No.: WO2015/101061
PCT Pub. Date: Jul. 9, 2015

(65) Prior Publication Data
US 2017/0003416 A1    Jan. 5, 2017

(30) Foreign Application Priority Data
Dec. 31, 2013  (CN) .......................... 2013 1 0753426

(51) Int. Cl.
*G01V 8/00* (2006.01)
*G01V 8/10* (2006.01)
(Continued)

(52) U.S. Cl.
CPC .................. *G01V 8/10* (2013.01); *G01J 5/10* (2013.01); *G01V 8/02* (2013.01); *G06T 5/001* (2013.01); *G06T 7/70* (2017.01); *G06T 7/0004* (2013.01)

(58) Field of Classification Search
CPC ...................................................... G01V 8/10
See application file for complete search history.

(56) References Cited

U.S. PATENT DOCUMENTS

2001/0035836 A1* 11/2001 Miceli ..................... G01S 7/412
                                                                                  342/22
2009/0144003 A1    6/2009 Murata

FOREIGN PATENT DOCUMENTS

CN              2819239           9/2006
CN            101576600         11/2009
(Continued)

OTHER PUBLICATIONS

Anweiler, "Nonlinear Extension of the Heat Equation and Infrared Imagery", 2009, University of Pannonia, pp. 5-12.*
(Continued)

*Primary Examiner* — John E Breene
*Assistant Examiner* — Jeffrey C Morgan
(74) *Attorney, Agent, or Firm* — Hamre, Schumann, Mueller & Larson, P.C.

(57) ABSTRACT

The present invention provides a method for infrared imaging detection and positioning of an underground tubular facility in a plane terrain. Demodulation processing is performed on an original infrared image formed after stratum
(Continued)

modulation is generated on the underground tubular facility according to an energy diffusion Gaussian model of the underground tubular facility, so as to obtain a target image of the underground tubular facility. The method comprises: obtaining an original infrared image g formed after stratum modulation is generated on an underground tubular facility; setting an initial value $h_0$ of a Gaussian thermal diffusion function according to the original infrared image g; using the original infrared image g as an initial target image $f_0$, and performing, according to the initial value $h_0$ of the Gaussian thermal diffusion function, iteration solution of a thermal diffusion function $h_n$ and a target image $f_n$ by by using a single-frame image blind deconvolution method based on a Bayesian theory; and determining whether an iteration termination condition is met, and if the iteration termination condition is met, determining that the target image $f_n$ obtained by means of iteration solution this time is a final target image f; and if the iteration termination condition is not met, continuing the iteration calculation. By means of the method, the display of the infrared image of the original underground tubular facility is clearer, and the real structure of the underground tubular facility can also be inverted.

4 Claims, 7 Drawing Sheets

(51) Int. Cl.
*G06T 5/00* (2006.01)
*G01J 5/10* (2006.01)
*G06T 7/70* (2017.01)
*G01V 8/02* (2006.01)
*G06T 7/00* (2017.01)

(56) References Cited

FOREIGN PATENT DOCUMENTS

| CN | 102735347 | 10/2012 |
| CN | 103744124 | 4/2014 |
| CN | 103884431 | 6/2014 |
| JP | 2005283383 | 10/2005 |
| JP | 2009014532 | 1/2009 |
| RU | 2465621 | 10/2012 |

OTHER PUBLICATIONS

Cernuschi, "Thermal diffusivity measurements by photothermal and thermographic techniques", Mar. 2004, vol. 25, Issue 2, pp. 439-457.*

Z. Kui, "Imaging Mechanism of Underground Hot Pipeline by Aerial Detection," Image Technology (1997), 5 pages, including English abstract.

International Search Report for international application No. PCT/CN2014/085758, dated Nov. 28, 2014 (6 pages, including English translation).

* cited by examiner

METHOD FOR INFRARED IMAGING DETECTION AND POSITIONING OF UNDERGROUND TUBULAR FACILITY IN PLANE TERRAIN

TECHNICAL FIELD

The present invention belongs to the interdisciplinary field of geophysics and remote sensing technologies, and in particular, relates to a method for infrared imaging detection and positioning of an underground tubular facility in a plane terrain.

BACKGROUND ART

Underground pipelines of a city are an important component of fundamental facilities of the city, and are compared to "blood vessels" of the city. They cross each other and are distributed in the whole city to construct a dense underground pipeline network of the city. The underground pipelines of the city provide energy sources, information and water for the city all the time, and provide a basis and guarantee for economic development and life of citizens. The number of the underground pipelines is large and data thereof is incomplete, great difficulties are caused in urban planning, development and establishment, scientific management, and correct decision. Accidents such as explosion of gas pipelines and disconnection of communication cables due to blind digging during construction occur frequently, causing great loss for the nation and people. Underground pipeline detection is also very important in terms of archaeology, petroleum, gas and mineral transportation. Therefore, it is necessary to carry out a research on detection and identification of a tubular underground facility.

Definitely, the most common and direct method for detecting failure of a heat-supplying underground tubular facility is manual interpretation; however, this method is very time consuming and the detection is inaccurate, and there is no report on failure-free positioning. The infrared imaging is proposed as a new technology of detecting an underground tubular facility; however, the technology of detecting an underground tubular facility using the infrared imaging around the world all directly use an infrared imaging sensor to perform imaging observation and manual interpretation.

The physical basis of the infrared remote sensing imaging is that a large amount of solar energy irradiated to the soil is absorbed to generate heat, and infrared radiation generated by the heated soil is detected by a thermal infrared sensor. Natural solar energy, after daily circulated heating and cooling, has different effects on a buried object and the land surrounding the object, thereby causing a detectable temperature difference. The existence of the underground tubular facility may cause a planar land surface thermal distribution abnormity, which can be used for detecting and positioning an underground target.

However, the limitations of the above method lie in that: 1. The thermal abnormity of the underground pipeline is conducted and modulated by the stratum in which it is buried, the thermal distribution reaching the land surface changes, which causes a large difference with the underground pipeline form, and is embodied as a greatly reduced thermal diffusion temperature difference and a weak thermal signal, resulting in that not only the position is changed, but also the underground pipeline is hard to be found and positioned; 2. It is difficult to directly use the infrared imaging sensing for performing manual interpretation, and the underground tubular facility cannot be found correctly and intuitively.

SUMMARY

Aiming at the above defects or improvement requirements of the prior art, the present invention provides a method for infrared imaging detection and positioning of an underground tubular facility in a plane terrain. Demodulation processing is performed on an original infrared image formed after stratum modulation is generated on the underground tubular facility according to an energy diffusion Gaussian model of the underground tubular facility, so as to obtain a target image of the underground tubular facility. The method includes the following steps:

A method for infrared imaging detection and positioning of an underground tubular facility in a plane terrain, where demodulation processing is performed on an original infrared image formed after stratum modulation is generated on the underground tubular facility according to an energy diffusion Gaussian model of the underground tubular facility, so as to obtain a target image of the underground tubular facility, the method comprising the following steps:

(1) obtaining an original infrared image g formed after stratum modulation is generated on an underground tubular facility;

(2) setting an initial value $h_0$ of a Gaussian thermal diffusion function according to a width of a thermal radiation energy band of the original infrared image g, and setting an iteration termination condition;

(3) using the original infrared image g as an initial target image $f_0$, and performing, according to the initial value $h_0$ of the Gaussian thermal diffusion function, iteration solution of a thermal diffusion function $h_n$ and a target image $f_n$ by by using a single-frame image blind deconvolution method based on a Bayesian theory; and (4) determining whether the iteration termination condition is met, and if the iteration termination condition is met, determining that the target image $f_n$ obtained by means of iteration solution this time is a final target image f; and if the iteration termination condition is not met, returning to step (3), and continuing the iteration calculation.

Preferably, the performing iteration solution of a thermal diffusion function $h_n$ and a target image $f_n$ by by using a single-frame image blind deconvolution method based on a Bayesian theory in step (3) specifically comprises:

performing Richardson-Lucy iteration calculation first according to the following two equations at $n^{th}$ blind iteration, $$h_{m+1}^n(x) = \left\{\left[\frac{g(x)}{h_m^n(x)*f^{n-1}(x)}\right]*f^{n-1}(-x)\right\}h_m^n(x),$$

$$f_{m+1}^n(x) = \left\{\left[\frac{g(x)}{h^n(x)*f_m^n(x)}\right]*h^n(-x)\right\}f_m^n(x),$$

where, m indicates the current number of Richardson-Lucy iterations, m=1☐M, and M indicates the total number of Richardson-Lucy iterations;

after M Richardson-Lucy iterations, obtaining $h_{m+1}{}^n(x)$ and $f_{m+1}{}^n(x)$, and solving $h^{n+1}(x)$ and $f^{n+1}(x)$ by using $h_{m+1}{}^n(x)$ and $f_{m+1}{}^n(x)$ as $h^n(x)$ and $f^n(x)$ in the following equations:

$$h^{n+1}(x) = \left\{ \left[ \frac{g(x)}{h^n(x)^* f^n(x)} \right] * f^n(-x) \right\}_n h^n(x)$$

$$f^{n+1}(x) = \left\{ \left[ \frac{g(x)}{h^{n+1}(x)^* f^n(x)} \right] * h^{n+1}(-x) \right\}_n f^n(x)$$

where, n is the current number of blind iterations, f(x) indicates the target image, g(x) indicates the original infrared image, h(x) is the thermal diffusion function, h(−x) indicates a conjugation of h(x), f(−x) indicates a conjugation of f(x), and * is a convolution operator.

Preferably, the iteration termination condition in the step (2) is that the number of iteration terminations n>$N_0$ or an error ε, and the determining whether the iteration condition is met in the step (4) is specifically:

determining whether or |g−$h^{n+1}$*$f^{n+1}$|<ε or n>$N_0$ is met, and if any of the two is met, determining that the iteration termination condition is met; otherwise, determining that the iteration termination condition is not met.

The method of the present invention performs demodulation processing on the infrared image formed after the stratum modulation is generated on the underground tubular facility, so that the display of infrared image of the original underground tubular facility is clearer, and the real structure of the underground tubular facility may also be inverted. Key physical features of the underground tubular facility may be deduced according to the known infrared information in the acquired infrared image, thereby achieving the objective of "seeing" and further quantitatively measuring the key physical features of the underground tubular facility.

DETAILED DESCRIPTION

In order that the objectives, technical solutions and advantages of the present invention become more comprehensible, the present invention is further described in detail in combination with the accompanying drawings and the embodiments. It should be understood that, the specific embodiments described herein are merely used to explain the present invention, and are not intended to limit the present invention. Moreover, technical features involved in the implementation manners of the present invention described in the following may be combined with each other as long as no conflict is caused.

The present invention provides a method for infrared imaging detection and positioning of an underground tubular facility in a plane terrain. In the method, demodulation processing is performed on an original infrared image formed after stratum modulation is generated on the underground tubular facility according to an energy diffusion Gaussian model of the underground tubular facility, a detection problem is boiled down to an inversion problem in mathematical physics, structure information and position of the underground tubular facility are detected to implement detection and positioning of the underground tubular facility, and reports the same as the present invention have not been seen in existing domestic and foreign literatures.

Figure 1:
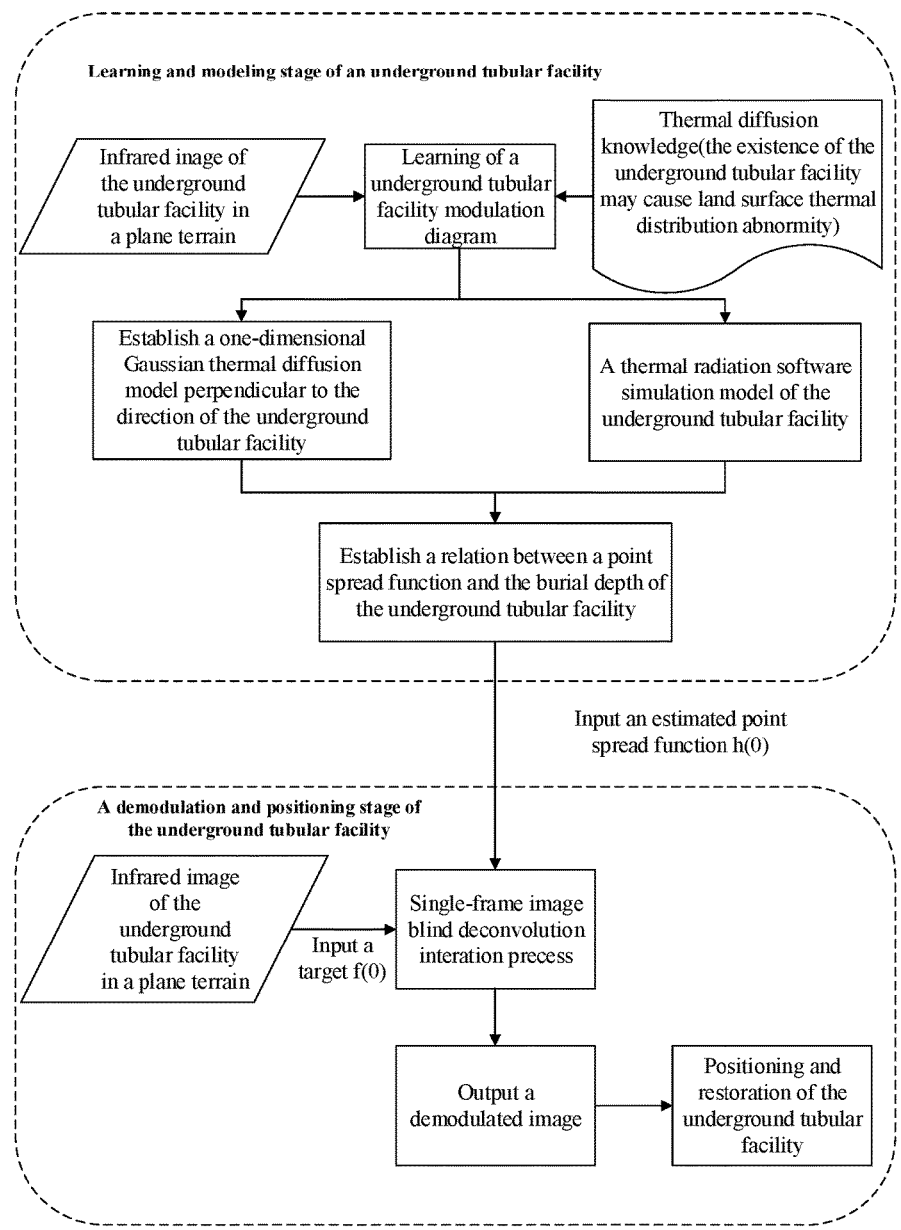
FIG. 1 is a schematic overall flow chart of the present invention.

The process of the present invention is shown in FIG. 1, and a specific implementation method includes the following steps: thermal infrared characteristic analysis and modeling of a planar underground tubular target, a modulation process of an underground tubular target image, a demodulation processing of the underground tubular target image, and restoration and positioning of the underground tubular target image.

(1) Thermal Infrared Characteristic Analysis and Modeling of an Underground Tubular Target An underground tubular target can be detected by means of thermal infrared imaging remote sensing because of heat energy exchange between a distributed heat source of the target and surrounding stratum and a thermal inertia difference between the tubular underground facility and the surrounding stratum. Here, by using thermal infrared radiation abnormity caused by the underground target on the land surface, an effect of the existence of the underground target on regional thermodynamic property is analyzed and researched from the perspective of thermodynamics, and a one-dimensional Gaussian thermal diffusion mathematical model that can accurately describe regional temperature distribution.

Figure 2:
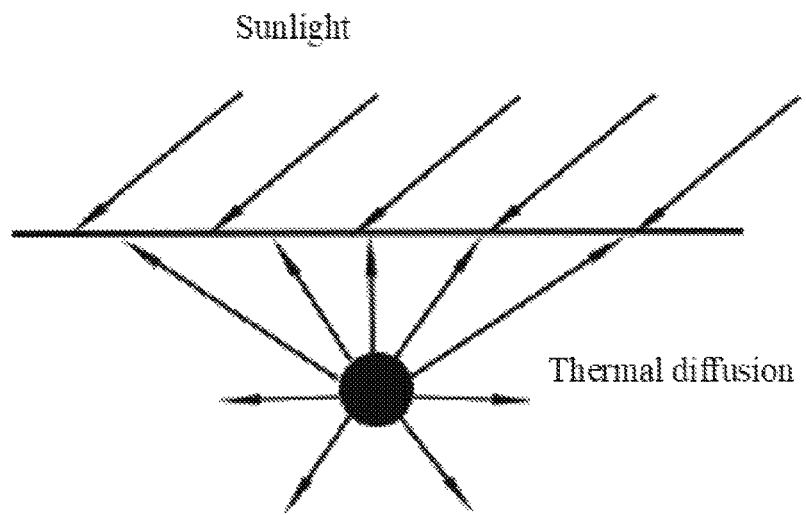
FIG. 2 is a schematic diagram of thermal diffusion.
Figure 3:
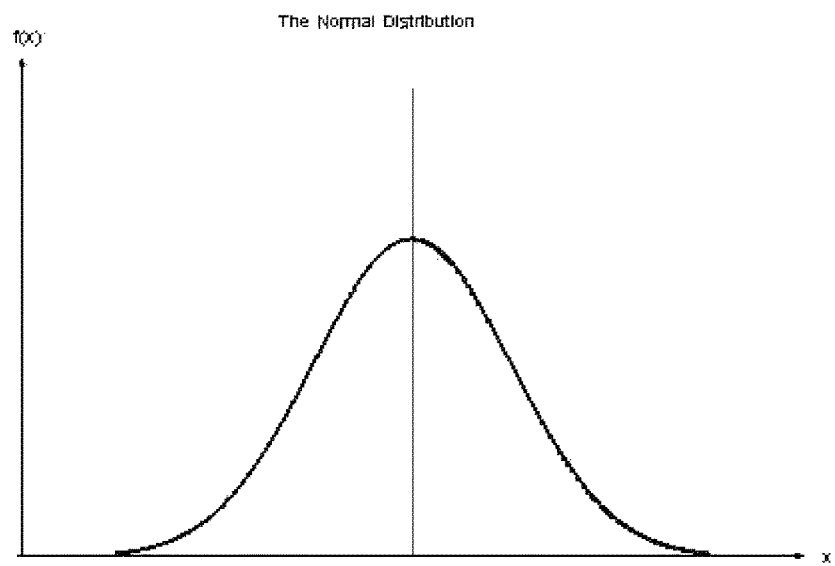
FIG. 3 is a Gaussian heat distribution model.
Figure 4:
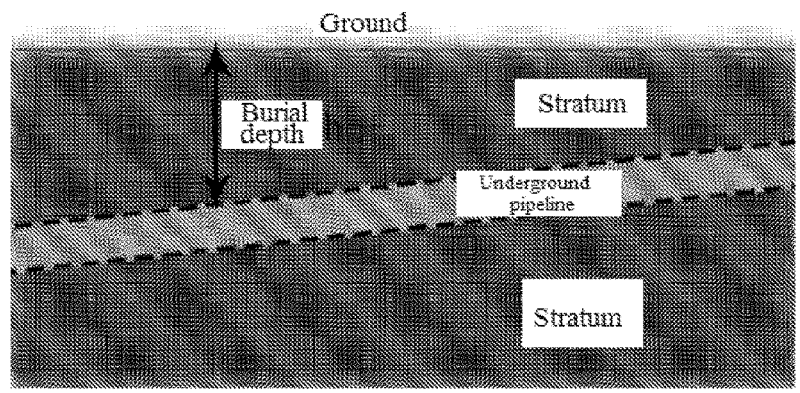
FIG. 4 is a sectional diagram of an underground tubular target.
Figure 5:
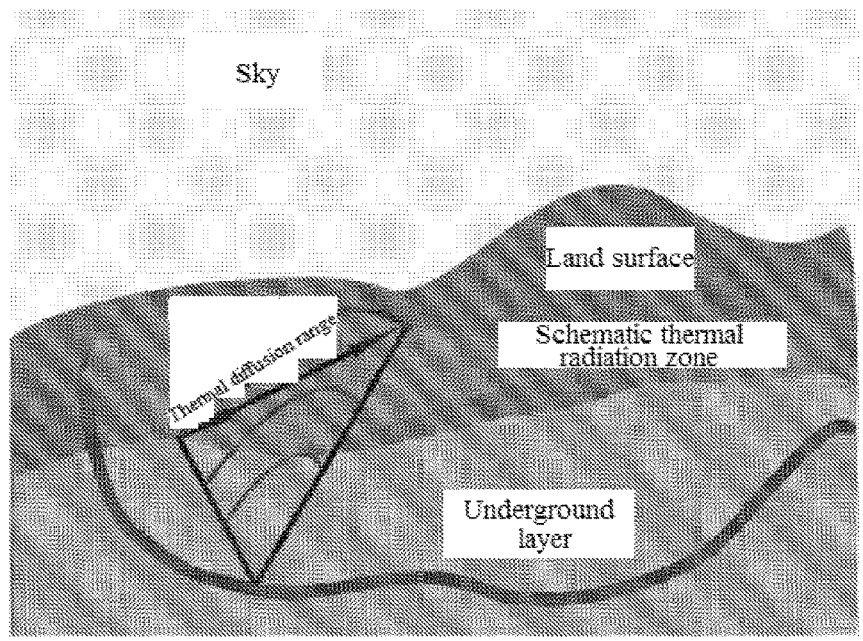
FIG. 5 is a top view of thermal diffusion of an underground tubular target.

A soil environment where the underground tubular target is located is assumed as a relatively uniform thermal diffusion environment, and it is assumed that a heat source is constant, heat is diffused to the stratum and nearby stratums along a direction perpendicular to the underground tubular target with the underground tubular target as a center, and a schematic diagram of the thermal diffusion is shown in FIG. 2, in which heat energy is diffused to the surrounding space at 360° with the heat source as a center point, a heat energy range expressed on the land surface is less than 180°, while along the direction of the underground tubular target, heat energy overlaps with each other and cannot be separated, the heat energy distribution in the direction perpendicular to the underground tubular target conforms to one-dimensional Gaussian distribution when reaching a heat balance state, and a heat distribution model is shown in FIG. 3. A segment of underground tubular target is selected, and a sectional diagram thereof is shown in FIG. 4, the burial depth of the underground tubular target varies, and the material of the upper stratum is different; therefore, a standard deviation of the Gaussian thermal diffusion changes along with the trend of the underground tubular target, specifically related to the depth and the material above the stratum. A thermal image presented by an underground tubular target with even thickness on the stratum may possibly present unequal-width thermal diffusion bands, and a top view of the thermal distribution is shown in FIG. 5.

To display the land surface infrared information of the underground tubular target after the stratum modulation, ANSYS is used to simulate the thermal distribution of the underground tubular target in the planar land surface environment with a depth of 100 meters.

Figure 6:
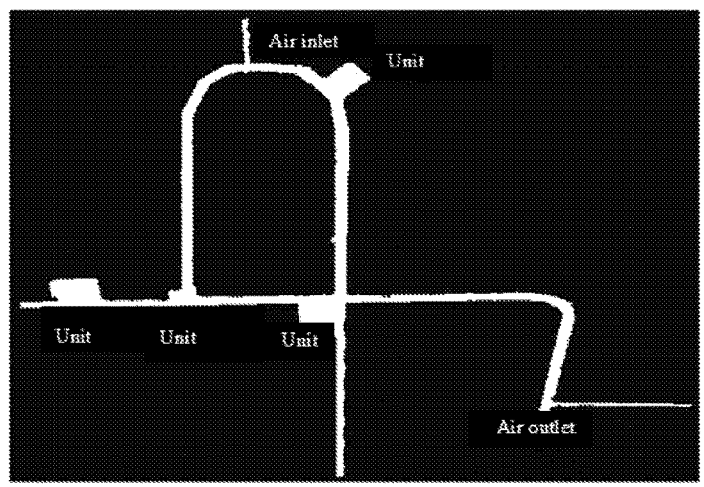
FIG. 6 is a typical tubular underground target model.
Figure 7:
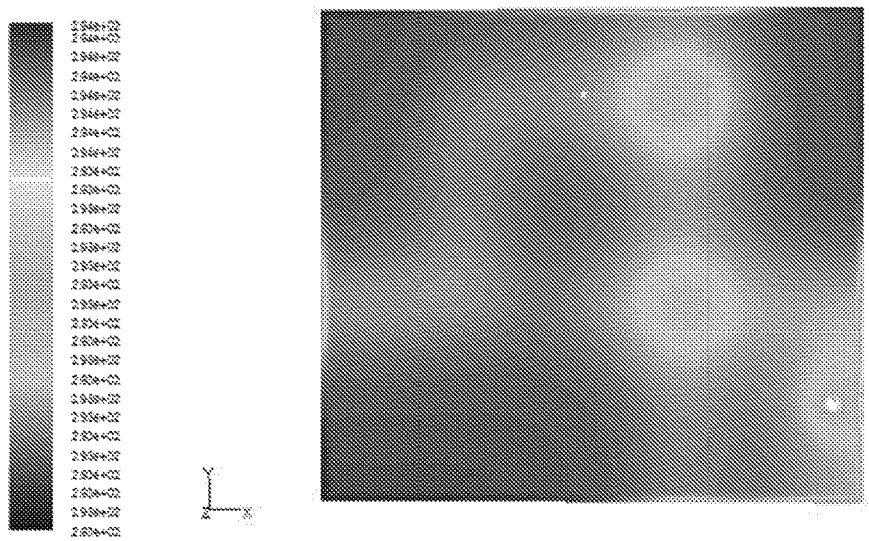
FIG. 7 is a simulation model diagram of thermal distribution of a tubular underground target and a temperature difference ΔT between an upper land surface of a function area and a background area.

The specific modeling of the simulation of the thermal diffusion of the underground tubular facility includes the following steps:

selecting a surface effect unit SURF 151, which utilizes node travel unit on the surface of an entity, and directly covers the surface of the entity unit, where, the SURF 151 unit has main real constants (an angular coefficient, a Stefan-Boltzmann constant), material attributes (density, thermal diffusion), a surface load (convection, heat flux) and a body load (heat generation rate);

setting the material attributes corresponding to the surface effect unit; setting the density as 7800, the specific heat as 465, and the radiance as 1;

setting the real constants of the surface effect unit; the Stefan-Boltzmann constant being $5.67 \times 10^{-8}$, and setting a shape parameter of the angular coefficient as 1;

creating a geometric model, and dividing grids; setting a Keypoint number as a default value, and setting Global Element Sizes as 3, so as to generate a finite element model;

loading and solving by using the Anasys;

viewing a solution result, and drawing a simulation image by using the Anasys, for example, FIG. 6 is a typical tubular underground target model, and FIG. 7 is a simulation model diagram of thermal distribution of a tubular underground target and a temperature difference $\Delta T$ between an upper land surface of a function area and a background area established by using this method.

(2) Modulation Processing of the Underground Tubular Target Image

A general underground tubular target keeps a state of substantial constant temperature and humidity due to various requirements and is different from the stratum environment, the thermal diffusion thereof is modulated by the stratum, which will cause changes of substance and energy migration state of the detected area, so that the land surface temperature distribution is abnormal, and a unique infrared information field different from other detected areas is generated. The modulation form is presented as a one-dimensional Gaussian thermal diffusion modulation model perpendicular to the direction of the underground tubular target. This process is verified through experiments, and the specific experiment process is as follows:

Simulation research is performed on the effect of the underground tubular target on thermal transferring, and it indicates that the existence of the underground tubular target may cause land surface thermal distribution abnormality, which can be used for detecting and positioning an underground target. At the same time, land surface thermal time-space distributions caused by different target depths also differ from each other.

Simulated calculation results of time required by a unit having an area of 150 m$^2$ to embody a temperature difference of 0.5K on a covering land surface through energy exchange under the condition of a constant temperature of 25° in different depths, different bury mediums and different heat dissipation power are shown in the following table, and it indicates that the stratum cannot block the energy exchange of the target.

| Total depth | Soil | | Soil + 10 m thick granite | |
|---|---|---|---|---|
| | 50 W/m2 | 100 W/m2 | 50 W/m2 | 100 W/m2 |
| 30 m | 73 days | 49 days | 79 days | 54 days |
| 65 m | 158 days | 107 days | 171 days | 117 days |
| 100 m | 243 days | 164 days | 272 days | 187 days |

The experiment above indicates that the existence of the tubular underground target may cause land surface thermal distribution abnormity, and stratums of different mediums cannot block energy exchange of the target. Meanwhile, a standard deviation parameter $\sigma$ of the Gaussian thermal diffusion function may have the following relation with a burial depth h of an underground building and a stratum material thermal conductivity $\varepsilon$:

$$(h/\varepsilon)=k\sigma+l$$

Thermal distribution abnormity caused by a hydropower grid is also tested and analyzed, an infrared image of an underground tubular target is acquired through thermal imaging, a thermal blooming image is formed after stratum modulation, and by comparing a long-wave infrared image with a pseudo-color displayed image of the long-wave infrared image, heat zones presented by the underground tubular target on the stratum surface after thermal diffusion may be observed.

Figure 8:
FIG. 8 is a long-wave infrared image of a water-feed pipeline and a sewer pipeline in an embodiment of the present invention.

The experiment process is shown in the drawing, and FIG. 8 shows a long-wave infrared image of a water-feed pipeline and a sewer pipeline. The water-feed pipeline and the sewer pipeline are invisible in the infrared image, and merely their approximate positions relative to the thermal blooming image are marked.

Figure 9:
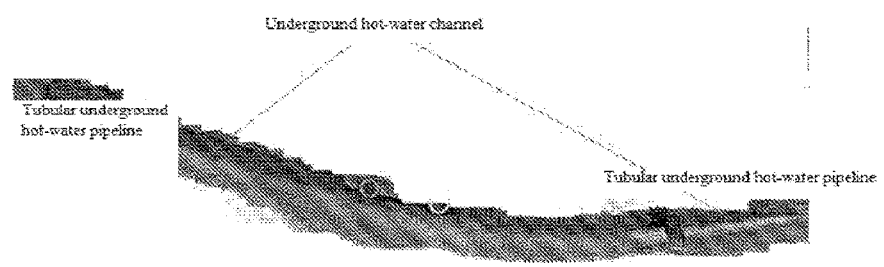
FIG. 9 is a long-wave infrared image of an upper land surface of an underground tubular hot-water pipeline in an embodiment of the present invention.

According to this method, detection on an underground hot-water pipeline in another area is performed, and FIG. 9 shows a long-wave infrared image of an upper land surface of a tubular underground hot-water pipeline. Likewise, the underground hot-water pipeline invisible in a visible image is slightly visible after undergone stratum modulation.

The experiment shows that: the existence of the underground tubular target may cause the land surface thermal distribution abnormity, and although these pipe networks are invisible in a visible image due to shielding of the stratum, heat zones formed by the underground target (pipelines) on the land surface after thermal diffusion are formed in the thermal blooming image after stratum modulation is generated on the underground target.

(3) Demodulation Processing of the Underground Tubular Target Image

The heat zones formed by the underground target (pipelines) on the land surface after the thermal diffusion are formed in the thermal blooming image after stratum modulation is generated on the underground target, so that, specific locations, morphological characteristics, lower target structures, running states and the like of the underground tubular target may be accurately restored and positioned through the demodulation processing. Here, on the basis of modeling on thermal diffusion of energy after being positive modulation transformed through the stratum, a corresponding energy convergence inverse transformation model is constructed, and underground structure information shielded by the stratum is disclosed after the inverse transformation processing.

In order to effectively restore the underground tubular target from the thermal blooming image after the stratum modulation, a single-frame image blind deconvolution method based on a Bayesian theory is proposed. The problem of restoring heat zones of an underground tubular target is similar to the problem of restoring an image from a blurred image, and herein, an image restoration method is used. The difficulty of the image restoration problem lies in that, on the one hand, the blurring process is diversified, so that it is difficult to establish a uniform mathematic model, and on the other hand, due to the existence of noise, the image restoration problem is not a simple inversion problem but an ill-posed inversion problem. A single-frame image blind deconvolution algorithm is an important aspect of an image restoration algorithm, and this algorithm can obtain a good restoration result by merely using a single-frame image. In order to apply knowledge related to probability statistics, an original image, a point spread function and a degraded image are all considered as functions of a probability frequency, and the functions are further analyzed and processed by applying the Bayesian theory, thereby achieving the objective of restoring the image. The algorithm can ensure that the energy bands of the underground tubular target are restored dramatically in probability meanings.

1 Summary of the Method

The blind deconvolution specially refers to an image restoration technology in a case that a Point Spread Function (PSF) and complete information of the target cannot be acquired. Ayers and Dainty provide a solution, and substantially, the solution is a promotion of a Feinup phase retrieval algorithm. The adopted method is iteration, and limitation is performed on non-negativity of the image using prior knowledge. During each iteration, estimated values of the target and the PSF may be obtained through simple inverse filtering. Davey et al. proposed a similar solution; however, their algorithm further set the prior knowledge, that is, a target support rate is known. In their research, a wiener filter is used to obtain the estimations on the target and the PSF, so that better noise compensation can be provided.

A Richardson-Lucy based blind deconvolution algorithm is implemented. In a noise condition, the Richardson-Lucy algorithm has been proved to have stronger robustness; therefore, it is considered that the blind deconvolution algorithm based on this is superior to Ayers-Dainty and Davey-Lane-Bates algorithms. Experiment results also prove that our new algorithm has a high noise-tolerant capability.

To further improve the performance of the algorithm, additional prior knowledge is added by setting the function form for the PSF. It is considered that this method can obtain a better result, since unknowns are reduced from thousands of pixel values to a small part of parameters describing the PSF. By using this method, the blind deconvolution is likely to find a place in many fields, and in these fields, abnormity of an optical system cannot be known accurately, but features thereof may be described by using some free parameters. An example of such an application is a space telescope, here, accurate information of the PSF cannot be acquired due to an unknown deviation of a lens caused by a time-varying gravitational field.

2 Mathematic Model and Algorithm Principle

The Richardson-Lucy deconvolution method is briefly introduced first, and a blind form of the algorithm is then introduced. The Richardson-Lucy algorithm is deduced from the Bayesian theorem. It is related to condition probability, and the statistical deviation in a signal is considered therein, therefore, this algorithm has the capability of restoring a noise image. According to the knowledge of statistical probability, the Bayesian theorem may be provided by the following equation:

$$P(x|y) = \frac{P(y|x)P(x)}{\int P(y|x)P(x)dx} \qquad (1)$$

A discrete form thereof is $$P(x|y) = \frac{P(x|y)P(x)}{\sum_{x \in x} P(y|x)P(x)} \qquad (2)$$

where P(y|x) is a condition probability of an event y in a given event x. P(x) is the probability of the event x, and P(x|y) is an inverse condition probability, that is, the probability of the event x in the given event y.

For an image restoration problem of a Linear Shift Invariant system, generally, it is assumed that a degraded image g, a PSF h and an original image f have the following relation: g=h*f, where the symbol '*' indicates linear convolution. It is assumed that g, h and f are all discrete probability frequency functions, a value of each point on g, h, and f may be considered as the frequency count of an event (it is assumed that collecting a unit of photon is an event) occurred on this point. During the calculation, f is generally normalized. To facilitate description, indications of some symbols are appointed: $g_{i,j}$, $h_{i,j}$ and $f_{i,j}$ indicate numerical values at the coordinates (i,j) in image arraies, for example, $g_{i,j}$ indicates a numerical value of a degraded image array g at the position (i,j); and if g, h and f have no subscripts, they indicate whole arrays or numerical value results (for example, g=$\Sigma g_i$) obtained by performing summation on the whole arrays.

If the degraded image g and the PSF h are given, and it is requested to find the original image f, the Bayesian theorem is naturally thought of. An expression of the occurring probability of $f_i$ under the condition where an event $g_k$ occurs is provided by using the symbols provided in the foregoing:

$$P(f_i|g_k) = \frac{P(g_k|f_i)P(f_i)}{\sum_j P(g_k|f_j)P(f_j)}; \qquad (3)$$

where, i,j∈f (original image space), k∈g (degraded image space), and $g_k$ refers to a random part of g. In consideration of independence applied on $f_i$ by by all $g_k$ in combination with h, the following equation is obtained $$P(f_i) = \sum_k P(f_i g_k) = \sum_k P(f_i|g_k)P(g_k) \qquad (4)$$

Since $P(f_i|g_k)=P(f_i g_k)/P(g_k)$, the equation (3) is substituted into the equation (4), so as to obtain $$P(f_i) = \sum_k \frac{P(g_k|f_i)P(f_i)P(g_k)}{\sum_j P(g_k|f_j)P(f_j)} \qquad (5)$$

It can be seen that, the right part of the equation (5) also contains $P(f_i)$, which is the expected solution, and it is very difficult to solve directly. In many applications of the Bayesian theory, when a term like $P(f_i)$ is unknown, such an acceptable strategy may be adopted, that is, a best solution is selected from not-so-good conditions and an estimation of $P(f_i)$ is used to acquire an approximate $P(f_i|g_k)$; therefore, by using the equation (5), the following iteration equation may be obtained:

$$P^{n+1}(f_i) = P^n(f_i) \sum_k \frac{P(g_k | f_i) P(g_k)}{\sum_j P(g_k | f_j) P^n(f_j)} \qquad (6)$$

where, n is the number of blind iterations.

Definitely, $P(f_i)=f_i/f$, $P(g_k)=g_k/g$, and since the process of th image restoration is an energy conservation process, the following relation is obtained: $f=g$ (total energy, that is, the total number of photons), and $$P(g_k | f_i) = P(h_{i,k}) = h_{i,k}/h, \quad h = \sum_j h_j;$$

therefore, the equation (6) may be written as:

$$f_i^{n+1}/f = (f_i^n/f) \sum_k \frac{(h_{i,k}/h)(g_k/f)}{\sum_j (h_{j,k}/h)(f_j^n/f)}$$

that is, $$f_i^{n+1} = f_i^n \sum_k \frac{h_{i,k} g_k}{\sum_j h_{j,k} f_j^n} \qquad (7)$$

It can be seen from the equation (7) that, if an initial value $f_{i,0}$, $h_{i,0}$ and the number n of iterations are given, a corresponding iteration solution may be obtained. Generally, a uniformly distributed initial value is selected according to the Bayesian assumption, that is, the initial estimation of the original image may be designed as an image space whose pixel values are all 1. This is the well-known Richardson-Lucy deconvolution algorithm.

The reason why the Richardson-Lucy algorithm is widely interested lies in its application in Maximum Likelihood Estimation and the significant capability of obtaining a restored image with better quality in a high noise level. Therefore, it is assumed that the blind form of such algorithm also has the same characteristic. A similar blind deconvolution algorithm is also obtained by Holmes using the expectation maximization algorithm of Dempster et al.

3 Algorithm Implementation and a Flow Chart Thereof

To achieve convenient deduction and description, the equation (7) is written into a form of continuous integration:

$$f^{n+1}(x) = f^n(x) \int \frac{h(y,x)g(y)dy}{\int h(y,z)f^n(z)dz} \qquad (8)$$

where n is the number of blind iterations, x, z∈X, X is a support domain of the target, y∈Y, Y is a support domain of an observed image, where the support area of the PSF is generally less than the support area of an image. When it is assumed that the area of the observed target is an isoplanatic condition, the PSF will be space shift invariant, and is merely related to the difference of (y−x); therefore, the equation (8) may be written into a convolution form:

$$f^{n+1} = \left\{ \left[ \frac{g(x)}{h(x) * f^n(x)} \right] * h(-x) \right\}_n f^n(x) \qquad (9)$$

where '*' is a convolution operator. It is assumed herein that the PSF h(x) is known, so that iteration may be performed on the equation (9) until it is converged to obtain the target f(x). An initial estimation of the target $f_0(x)$ is used to start this algorithm. Then, in the subsequent iteration, because of the form used by the algorithm, large deviations relative to a real target in the initial estimation are quickly discarded in the initial iteration; and details are more slowly added in the subsequent iterations. If it is initially estimated that $f_0(x) \geq 0$, the advantage of this algorithm further lies in that it includes a non-negative constrain condition, and energy is stored along with the iteration.

In an actual situation, the PSF h(x) is generally unknown, in that case the iteration algorithm in the foregoing is difficult to implement; therefore, a new algorithm strategy has to be used. To avoid this situation, a new iteration method is used. The new iteration method has two iteration steps, that is, iteration calculations are performed respectively on the PSF and the target image. In the blind form of the algorithm, two of these deconvolution steps are necessary. During the $n^{th}$ blind iteration, it is assumed that the target is obtained by the $(n-1)^{th}$ iteration. Thereafter, the PSF $h^n(x)$ is calculated according to a designated value m of the Richardson-Lucy iteration, as shown in an equation (10), here, the subscript m indicates the number of Richardson-Lucy iterations. This equation is substantially an inverse form of the equation (9), this is because the target and the PSF are inverse to each other, and the PSF is calculated by using the target. Then, $f^n(x)$ is calculated according to the same number of Richardson-Lucy iterations. This step is performed by using the PSF obtained through estimation after the complete iteration using the equation (10). In this situation, the iteration is performed in the conventional form of the equation (9), as shown in an equation (11) in the following. The degraded image is given as g(x) again in the equations (10) and (11). Circulation is repeated as required, so as to obtain $$h_{m+1}^n(x) = \left\{ \left[ \frac{g(x)}{h_m^n(x) * f^{n-1}(x)} \right] * f^{n-1}(-x) \right\} h_m^n(x) \qquad (10)$$

$$f_{m+1}^n(x) = \left\{ \left[ \frac{g(x)}{h^n(x) * f_m^n(x)} \right] * h^n(-x) \right\} f_m^n(x) \qquad (11)$$

The Richardson-Lucy iteration calculation is performed first according to the following two equations during the $n^{th}$ blind iteration, $$h_{m+1}^n(x) = \left\{ \left[ \frac{g(x)}{h_m^n(x) * f^{n-1}(x)} \right] * f^{n-1}(-x) \right\} h_m^n(x),$$

-continued $$f_{m+1}^n(x) = \left\{\left[\frac{g(x)}{h^n(x) * f_m^n(x)}\right] * h^n(-x)\right\} f_m^n(x),$$

where, m indicates the current number of Richardson-Lucy iterations, m=1☐M, and M indicates the total number of Richardson-Lucy iterations;

after M Richardson-Lucy iterations, $h_{m+1}{}^n(x)$ and $f_{m+1}{}^n(x)$ are obtained, and $h^{n+1}(x)$ and $f^{n+1}(x)$ are solved by using $h_{m+1}{}^n(x)$ and $f_{m+1}{}^n(x)$ as $h^n(x)$ and $f^n(x)$ in the following equations:

$$h^{n+1}(x) = \left\{\left[\frac{g(x)}{h^n(x) * f^n(x)}\right] * f^n(-x)\right\}_n h^n(x)$$

$$f^{n+1}(x) = \left\{\left[\frac{g(x)}{h^{n+1}(x) * f^n(x)}\right] * h^{n+1}(-x)\right\}_n f^n(x)$$

where, n is the current number of blind iterations, f(x) indicates the target image, g(x) indicates the original infrared image, h(x) is the thermal diffusion function, h(−x) indicates a conjugation of h(x), f(−x) indicates a conjugation of f(x), and * is a convolution operator.

Before the iteration starts, an iteration termination condition needs to be set, for example, it is set that the iteration termination condition is that the number of iteration terminations n>$N_0$ or an error ε. After each blind iteration is completed, it is determined whether |g−$h^{n+1}$*$f^{n+1}$|<ε or n>$N_0$, and if any of the two is met, it is determined that the iteration termination condition is met, and the iteration calculation is ended; otherwise, it is determined that the iteration termination condition is not met, and the iteration calculation is continued.

Figure 10:
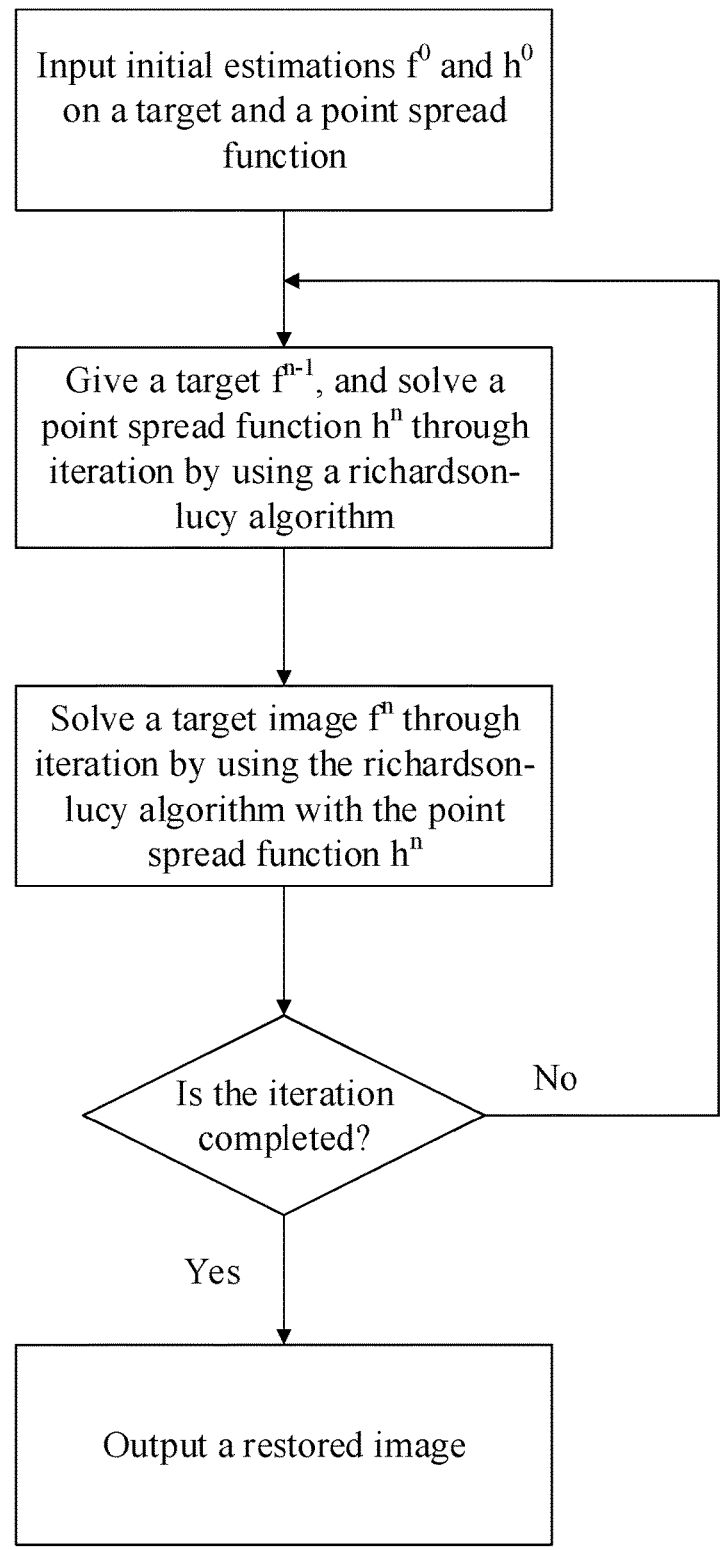
FIG. 10 is a flow chart of a single-frame blind image restoration algorithm according to the present invention.
Figure 12:
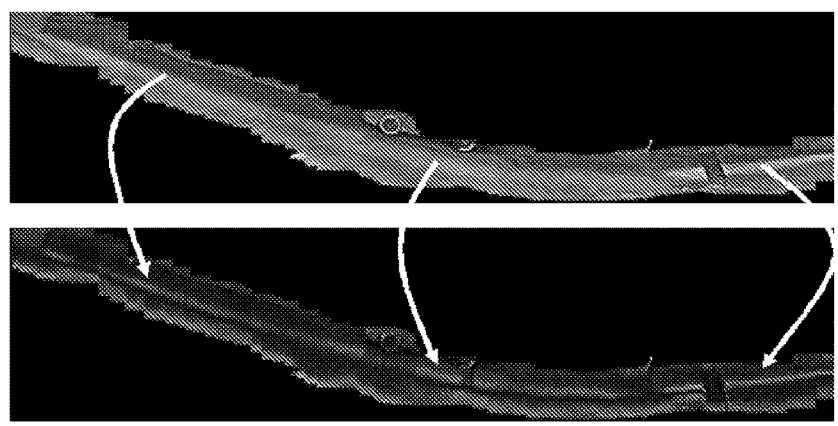
FIG. 12 shows an original infrared image (upper diagram) of an underground hot-water pipeline and an inverse transformation result (lower diagram) thereof.

The above equations are expressed by using a one-dimensional form, and may be directly expanded to a two-dimensional image form. First, initial estimation is performed on the target $f_0{}^0(x)$ and the PSF $h_0{}^0(x)$, and then, an algorithm circulation in the form as shown in FIG. 12 is performed. Here, no positive constrain condition is required, since the above equation is always positive. This algorithm is different from Holmes, because, in a blind iteration, there are merely two Richardson-Lucy iterations: one is the estimation on the PSF, and the other is the estimation on the target. It is found through research that, if the number of Richardson-Lucy iterations in one blind iteration is too small, the simulation image effect obtained in such an iteration manner is not good; however, when the number of Richardson-Lucy iterations in one blind iteration is increased to about 8, a much better effect is implemented. A flow chart of a single-frame blind image restoration algorithm is shown in FIG. 10.

When initial estimation is performed on the target $f_0{}^0(x)$ and the PSF $h_0{}^0(x)$, the thermal blooming image formed after the stratum modulation is used as the initial target $f_0{}^0(x)$. The estimation on the PSF $h_0{}^0(x)$ may be obtained by using the Gaussian thermal diffusion model established in the first part according to the thermal diffusion theory of physics. The PSF G at each place of the underground tubular target is related to the depth and material, and when the PSF is estimated, it is assumed that the depth and material have no great change relative to an underground tubular target. According to the 66 principle, a rough $h_0{}^0(x)$ may be estimated according to the width of the thermal radiation energy band, that is, the standard deviation of the thermal diffusion function $h_0{}^0(x)$ is the width of the thermal radiation energy band divided by 6. (4) Restoration and Positioning of the Underground Tubular Target Image To describe the correctness of performing demodulation inversion on the image after the stratum modulation by using the single-frame image blind deconvolution method based on the Bayesian theory to solve direct thermal performance of the underground tubular target, the following experiment is performed. In this experiment, since the thermal diffusions along the direction of the underground tubular target are overlapped with each other and cannot be separated, one-dimensional blind convolution is performed on the stratum modulated image along the direction perpendicular to the underground tubular target, and the direction of the underground tubular target is obtained by means of substantial observation of the stratum modulated image.

Figure 11:
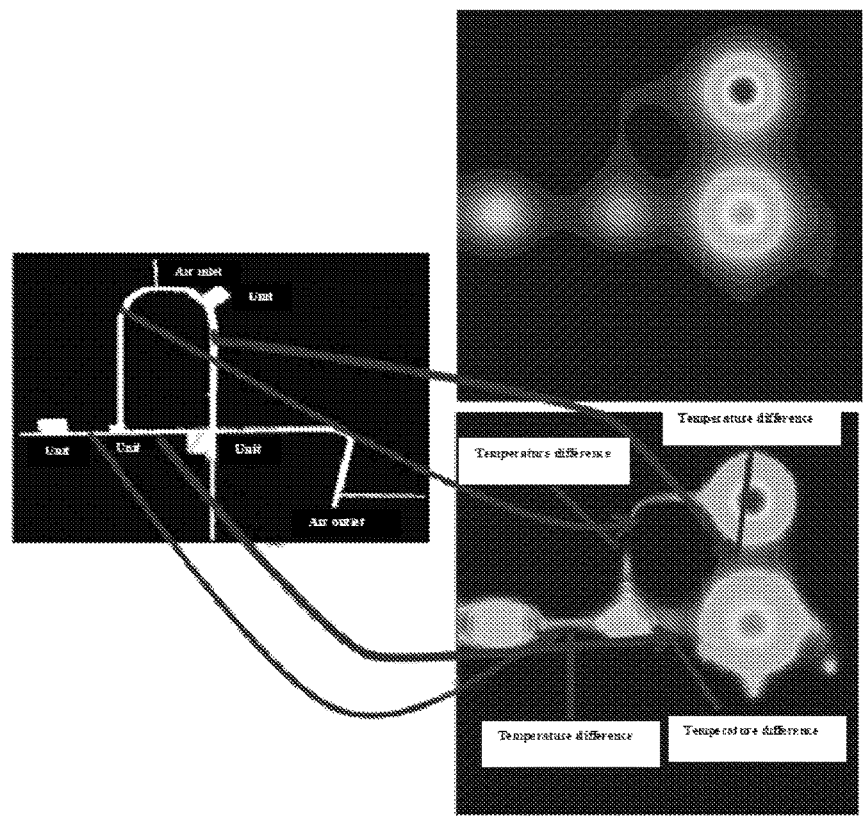
FIG. 11 shows land surface temperature distribution (upper right) and an inverse transformation result (lower right) of an underground target (flat ground, with a depth of 100 m)

FIG. 11 shows land surface temperature distribution (upper right) and an inverse transformation result (lower right) of an underground facility when the typical underground structure shown in FIG. 6 is in an environment of a flat ground with the depth of 100 m. The experiment proves that the underground structure information shielded by the stratum may be disclosed through inversion.

On the basis of this, the underground hot-water pipeline is further processed by using the inversion method, and an experiment result is that: in FIG. 12, the upper diagram is the original infrared image of the underground hot-water pipeline, and the lower diagram is an inversion result thereof.

This experiment indicates that a relatively accurate heat source position and a structural shape thereof may be obtained from an extremely weak thermal blooming signal through inversion. Without using the present invention, the underground tubular target thermal diffusion after the stratum modulation is integrated into the surrounding environment and cannot be distinguished; by using the present invention, the underground tubular target can be restored and positioned.

A person skilled in the art can easily understand that the above descriptions are merely preferred embodiments of the present invention, and are not intended to limit the present invention. Any modification, equivalent replacement and improvement made without departing from the spirit and principle of the present invention shall all fall within the protection scope of the present invention.

The invention claimed is:

1. A method of detecting an underground tubular facility in a plane terrain, the method comprising:
   directing an infrared imaging sensor to capture an original infrared image g using the infrared imaging sensor, the infrared imaging sensor being directed toward the plane terrain, the original infrared image g including the underground tubular facility which is not visible to a naked eye;
   setting an initial value $h_0$ of a Gaussian thermal diffusion function according to a width of a thermal radiation energy band in the original infrared image g;
   setting an iteration termination condition;
   setting the original infrared image g as an initial target image $f_0$;
   performing, according to the initial value $h_0$ of the Gaussian thermal diffusion function, iteration solution of a thermal diffusion function $h_n$ and a target image $f_n$ by using a single-frame image blind deconvolution method based on a Bayesian theory; and
   evaluating whether the iteration termination condition is met, if the iteration termination condition is met:
    determining that the target image $f_n$ obtained by means of the iteration solution is a final target image f, the final target image f being a clearer image than the original infrared image g, and outputting the target image $f_n$; and
if the iteration termination condition is not met:
    returning to the performing the iteration solution of the thermal diffusion function.

2. The method according to claim 1, wherein the performing iteration solution of a thermal diffusion function $h_n$ and a target image $f_n$ by using a single-frame image blind deconvolution method based on a Bayesian theory comprises:
    performing Richardson-Lucy iteration calculation first according to the following two equations at $n^{th}$ blind iteration, $$h_{m+1}^n(x) = \left\{\left[\frac{g(x)}{h_m^n(x) * f^{n-1}(x)}\right] * f^{n-1}(-x)\right\} h_m^n(x),$$

$$f_{m+1}^n(x) = \left\{\left[\frac{g(x)}{h^n(x) * f_m^n(x)}\right] * h^n(-x)\right\} f_m^n(x),$$

wherein, m indicates the current number of Richardson-Lucy iterations, m=1☐M, and M indicates the total number of Richardson-Lucy iterations;
after M Richardson-Lucy iterations, obtaining $h_{m+1}{}^n(x)$ and $f_{m+1}{}^n(x)$, and solving $h^{n+1}(x)$ and $f^{n+1}(x)$ by using $h_{m+1}{}^n(x)$ and $f_{m+1}{}^n(X)$ as $h^n(x)$ and $f^n(x)$ in the following equations:

$$h^{n+1}(x) = \left\{\left[\frac{g(x)}{h^n(x) * f^n(x)}\right] * f^n(-x)\right\}_n h^n(x)$$

$$f^{n+1}(x) = \left\{\left[\frac{g(x)}{h^{n+1}(x) * f^n(x)}\right] * h^{n+1}(-x)\right\}_n f^n(x)$$

wherein, n is the current number of blind iterations, f(x) indicates the target image, g(x) indicates the original infrared image, h(x) is the thermal diffusion function, h(−x) indicates a conjugation of h(x), f(−x) indicates a conjugation of f(x), and * is a convolution operator.

3. The method according to claim 2, wherein the iteration termination condition is that n is larger than the number of iteration terminations $N_0$ or $|g-h^{n+1}*f^{n+1}|$ is less than an error ε, and the determining whether the iteration termination condition is met includes:
    determining whether $$|g - h^{n+1} * f^{n+1}| < \varepsilon \text{ or } n > N_0$$

is met, and if any of the two is met,
    determining that the iteration termination condition is met;
    otherwise, determining that the iteration termination condition is not met.

4. The method according to claim 1, wherein the original infrared image g is formed after stratum modulation is generated on the underground tubular facility.

* * * * *